(12) United States Patent
Alonso et al.

(10) Patent No.: US 10,169,419 B2
(45) Date of Patent: *Jan. 1, 2019

(54) SYSTEM AND METHOD FOR GENERATING SOCIAL SUMMARIES

(71) Applicant: Microsoft Technology Licensing, LLC, Redmond, WA (US)

(72) Inventors: Omar Alonso, Redwood Shores, CA (US); Karen Shiells, Menlo Park, CA (US); Ho John Lee, Palo Alto, CA (US); Chad Carson, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

This patent is subject to a terminal disclaimer.

(21) Appl. No.: 15/013,934

(22) Filed: Feb. 2, 2016

(65) Prior Publication Data
US 2016/0203187 A1 Jul. 14, 2016

Related U.S. Application Data

(63) Continuation of application No. 12/979,232, filed on Dec. 27, 2010, now Pat. No. 9,286,619.

(51) Int. Cl.
*G06F 17/00* (2006.01)
*G06F 17/30* (2006.01)
(Continued)

(52) U.S. Cl.
CPC .. *G06F 17/30489* (2013.01); *G06F 17/30675* (2013.01); *G06F 17/30719* (2013.01);
(Continued)

(58) Field of Classification Search
CPC ......... H04L 51/32; H04L 67/22; H04L 67/02; G06Q 50/01; G06Q 10/10; G06Q 30/02;
(Continued)

(56) References Cited

U.S. PATENT DOCUMENTS

| | | |
|---|---|---|
| 8,326,880 B2 | 12/2012 | Carson, Jr. et al. |
| 9,218,630 B2 | 12/2015 | Yang et al. |

(Continued)

FOREIGN PATENT DOCUMENTS

| | | |
|---|---|---|
| CN | 102314489 A | 1/2012 |
| CN | 102414706 A | 4/2012 |
| CN | 102663046 A | 9/2012 |

OTHER PUBLICATIONS

"About your Peer Index Score", Retrieved from http://www.peerindex.net/help/, Aug. 6, 2010, 3 pages.

(Continued)

*Primary Examiner* — Quoc A Tran
(74) *Attorney, Agent, or Firm* — The Law Office of Michael E. Kondoudis (57) ABSTRACT

The described implementations relate to communication platforms that are provided over computer networks. One implementation provides a system that can include a storage component configured to store a plurality of communications having a common connector. The system can also include a score computation component that is configured to compute scores reflecting semantic relationships between individual communications from the plurality of communications. The system can also include a summary generation component that is configured to select one or more of the individual communications, based on the scores, and generate a summary of the common connector. The summary can represent the selected individual communications. The system can also include at least one processor configured to execute one or more of the components.

20 Claims, 9 Drawing Sheets

(51) Int. Cl.
*H04L 29/08* (2006.01)
*G06Q 30/02* (2012.01)
*G06Q 50/00* (2012.01)
*G06Q 50/30* (2012.01)
*G06F 17/27* (2006.01)
*G06F 3/0484* (2013.01)
*G06F 3/0481* (2013.01)
*G06F 3/038* (2013.01)
*G06F 3/0482* (2013.01)
*H04L 12/58* (2006.01)
*G06Q 10/10* (2012.01)

(52) U.S. Cl.
CPC ......... *G06Q 30/0201* (2013.01); *G06Q 50/01* (2013.01); *G06Q 50/30* (2013.01); *H04L 67/02* (2013.01); *G06F 3/038* (2013.01); *G06F 3/0481* (2013.01); *G06F 3/0482* (2013.01); *G06F 3/04812* (2013.01); *G06F 3/04842* (2013.01); *G06F 17/2715* (2013.01); *G06F 17/2725* (2013.01); *G06F 17/30864* (2013.01); *G06Q 10/10* (2013.01); *G06Q 30/02* (2013.01); *H04L 51/32* (2013.01); *H04L 67/22* (2013.01)

(58) Field of Classification Search
CPC ............ G06Q 30/0201; G06F 17/3053; G06F 17/30867; G06F 17/30864; G06F 17/2715; G06F 17/30675; G06F 17/30719; G06F 17/30489; G06F 3/0381; G06F 3/038; G06F 3/0482; G06F 3/04802
USPC ......................................... 715/750–758, 213
See application file for complete search history.

(56) References Cited

U.S. PATENT DOCUMENTS

| | | | |
|---|---|---|---|
| 9,286,619 B2 | 3/2016 | Alonso et al. | |
| 9,294,576 B2 | 3/2016 | Lange et al. | |
| 9,324,112 B2 | 4/2016 | Bailey et al. | |
| 2008/0104521 A1* | 5/2008 | Dubinko | G06F 17/30867 715/744 |
| 2009/0182589 A1* | 7/2009 | Kendall | G06Q 10/02 705/5 |
| 2010/0228611 A1 | 9/2010 | Shenfield | |
| 2010/0268830 A1* | 10/2010 | McKee | G06Q 10/10 709/228 |
| 2011/0066618 A1* | 3/2011 | Sigurbjornsson | G06F 17/30427 707/739 |
| 2011/0153423 A1* | 6/2011 | Elvekrog | G06Q 30/02 705/14.53 |
| 2011/0246463 A1 | 10/2011 | Carson et al. | |
| 2012/0166931 A1 | 6/2012 | Alonso et al. | |
| 2014/0189000 A1 | 7/2014 | Zhang et al. | |
| 2016/0125432 A1 | 5/2016 | Yang et al. | |
| 2017/0286429 A1 | 10/2017 | Lange et al. | |

OTHER PUBLICATIONS

"InnovationQ—IP.com", Retrieved From: https://iq.ip.com/discover, Retrieved on: Jun. 28, 2015, 7 Pages.
"Microsoft's Bing Search Engine to Index Microblogging and Twitter Tweets", Retrieved From: http://www.associatedcontent.com/article/1903504/microsofts_bing_search_engine_to_index.htlm, Jul. 2, 2009, 1 Page.
"Using Micro-Bloggng to Record Architectural Design Conversation alongside the BIM", Retrieved From: https://vdocuments.mx/using-micro-blogging-to-record-architectural-design-conversation-alongside-the-bim.html, May 11, 2009, 12 Pages.
"Non-Final Office Action Issued in U.S Appl. No. 12/691,145", dated Mar. 5, 2012, 11 Pages.
"Non-Final Office Action Issued in U.S. Appl. No. 12/753,909", dated Apr. 18, 2012, 11 Pages.
"Final Office Action Issued in U.S. Appl. No. 12/942,577", dated Jul. 31, 2013, 31 Pages.
"Non Final Office Action Issued in U.S. Appl. No. 12/942,577", dated Dec. 21, 2012, 29 Pages.
"Non-Final Office Action Issued in U.S. Appl. No. 12/942,577", dated Dec. 19, 2013, 30 Pages.
"Final Office Action Issued in U.S. Appl. No. 13/427,584", dated Jun. 19, 2014, 8 Pages.
"Final Office Action Issued in U.S. Appl. No. 13/427,584", dated Jan. 16, 2014, 9 Pages.
"Final Office Action Issued in U.S. Appl. No. 13/427,584", dated Apr. 6, 2015, 14 Pages.
"Non-Final Office Action Issued in U.S. Appl. No. 13/427,584", dated Oct. 6, 2014, 9 Pages.
"Non-Final Office Action Issued in U.S. Appl. No. 13/427,584", dated Jul. 1, 2013, 9 Pages.
"Non-Final Office Action Issued in U.S. Appl. No. 13/427,584", dated Mar. 14, 2014, 9 Pages.
"Final Office Action Issued in U.S. Appl. No. 13/733,009", dated Jan. 27, 2015, 11 Pages.
"Non-Final Office Action Issued in U.S. Appl. No. 13/733,009", dated May 22, 2014, 27 Pages.
"Supplementary Search Report Issued in European Patent Application No. 13822074.4", dated Jul. 20, 2016, 8 Pages.
"Office Action Issued in Chinese Patent Application No. 201380069201.0", dated Apr. 23, 2018, 14 Pages.
Cai, et al., "MASS: A Multi-Facet Domain-Specific Influential Blogger Mining System", In Proceedings of the IEEE 26th International Conference on Data Engineering, Mar. 1, 2010, pp. 1109-1112.
Cao, et al., "Density-based clustering over an evolving data stream with noise", In Proceedings of the 2006 SIAM international conference on data mining, Apr. 20, 2006, 12 Pages.

\* cited by examiner

Communication Database 300

301 — BigEd: #BobSmith is having a great season. June 3, 2010, 9:38 AM EDT

302 — LittleDave: I saw #BobSmith at an autograph session, he was such a nice guy. June 3, 2010, 9:45 AM EDT

303 — AccountantAnne: I can't believe #BobSmith already has more home runs than he did last year, and we haven't even hit the All-Star break yet. June 3, 2010, 10:27 AM EDT

304 — LawyerRob: #JohnJones is having a pretty good year, but if we can, we should deal him and a few prospects for Bob Smith. June 3, 2010, 11:30 PM EDT

305 — SergeantSally: #BobSmith is a class act, he handed my daughter a baseball during the seventh-inning stretch last night. June 4, 2010, 6:17 AM EDT

306 — LieutenantRick: #BlueSox are already out of contention this year, they need to trade Bob Smith to a contender and get some prospects. June 4, 2010, 11:14 AM EDT

307 — SmartKid: #BobSmith is on fire, he's hitting .397 since last August. June 4, 2010, 12:17 PM EDT

308 — BlueSoxFan: #BobSmith is one of the nicest players in baseball. June 4, 2010, 2:49 PM EDT

309 — NedTheContractor: #BobSmith is playing very well, but #BlueSox don't have the pitching to compete. June 4, 2010, 6:49 PM EDT

SYSTEM AND METHOD FOR GENERATING SOCIAL SUMMARIES

BACKGROUND

The Internet provides various opportunities for individuals to discuss subjects that interest them. For example, users may participate in message boards, maintain a blog, comment on various webpages (e.g., Facebook™ "walls," Youtube™ comments, etc.), or participate in a real-time messaging service such as Twitter™. A user who is interested in comments made by others on a particular topic can use these technologies to stay up to date on the latest discussions.

In some cases, users will include information such as hashtags in their comments to help other users identify the topic or topics that are being discussed. Thus, other users who are interested in a particular topic can search for comments that include the hashtag to find out more about the topic. Likewise, users can include web links that are associated with a particular topic in their comments. However, often the number of comments that reference a particular hashtag or web link can grow quite large. Due to the large number of comments, it may be relatively burdensome for the user to understand the major points of discussion associated with a particular hashtag or web link.

SUMMARY

This document relates to communication platforms that are provided over computer networks. One implementation is manifested as a system that can include a storage component configured to store a plurality of communications having a common connector. The system can also include a score computation component that is configured to compute scores reflecting semantic relationships between individual communications from the plurality of communications. The system can also include a summary generation component that is configured to select one or more of the individual communications based on the scores, and generate a summary of the common connector. The summary can represent the selected individual communications. The system can also include at least one processor configured to execute one or more of the components.

Another implementation is manifested as a technique that can include identifying a characteristic of a plurality of communications having a common connector. The technique can also include sorting the plurality of communications into at least a first group having first values for the characteristic and a second group having second values for the characteristic, and generating a first summary for the first group. The first summary can represent at least two of the communications from the first group. The technique can also include generating a second summary for the second group, and the second summary can represent at least two of the communications from the second group.

Another implementation is manifested as a technique that can include storing communications, and filtering the communications to identify a subset of the communications that include a common hashtag or web link. The technique can also include computing similarity scores for the identified subset of the communications, and the similarity scores can reflect semantic similarities among individual communications of the subset. The technique can also include computing diversity scores for the identified subset of the communications, and the diversity scores can reflect semantic differences among individual communications of the subset. The technique can also include combining the similarity scores and the diversity scores to determine total scores for the identified subset of communications, selecting one or more of the individual communications, based on the total scores, and generating a summary of the common hashtag or web link. The summary can represent the selected individual communications.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This document relates to communication platforms, and more specifically to using certain techniques to summarize communications made by users in a social networking context.

Generally speaking, users can submit communications to a communication platform. The communications can include social "connectors," such as web links or hashtags, that identify topics of interest such as news items, celebrities, or other topics that are discussed by the users. More generally, connectors can be any part of a communication that can be used to identify a particular topic. For example, individual words, letters, or combinations thereof could also serve as connectors.

A summary of a connector can be generated by identifying communications that include the connector, and selecting one or more representative communications that have semantic relationships with the other communications that include the connector. Thus, a user having the summary can understand the dominant themes of the discussion without necessarily having to read all of the communications that include the connector.

Figure 1:
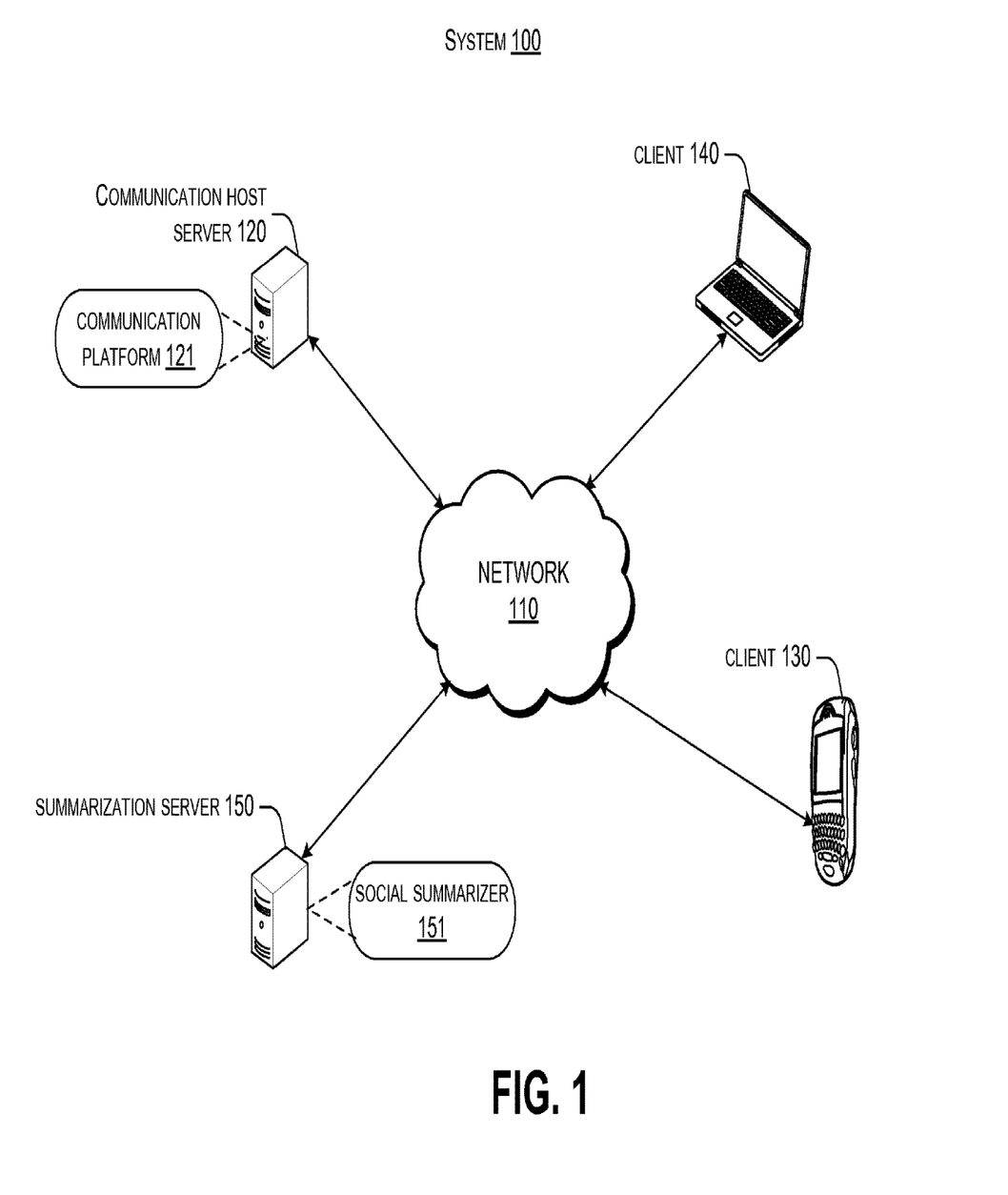
FIG. 1 shows an example of an operating environment in accordance with some implementations of the present concepts.

For purposes of explanation, consider introductory FIG. 1. FIG. 1 shows an exemplary system 100 that is consistent with the disclosed implementations. As shown in FIG. 1, system 100 includes a network 110 connecting numerous devices, such as a communication host server 120, client devices 130 and 140, and a summarization server 150. As discussed in more detail below, each device shown in FIG. 1 can include one or more processing devices, such as computer processors, executing instructions in a computer-readable storage medium such as a memory.

Communication host server 120 may host a communication platform 121. For example, communication host server 120 may host a social communications platform such as a message board, a blog or microblog, social networking accounts (e.g., Facebook™), a real-time messaging service (e.g., Twitter™), a web page that accepts user comments (e.g., Youtube™), or other communications platform. Generally speaking, communication platform 121 allows users to submit and/or retrieve communications such as comments that are added to a web page, "tweets," message board or forum posts, "wall" postings, blog posts, or other types of feedback or updates.

In some implementations, communication host server 120 can allow users to submit communications which are subsequently accessible by other users. For example, users may submit comments about a web page that may be made accessible to other users as soon as the other users access or refresh the web page. As another example, users may submit tweets about a particular topic, which may be transmitted to other users via Short Message Service ("SMS"). In some cases the communications can be made immediately available, e.g., immediately posted to a web page. In other cases, the communications can require approval by a moderator or other entity before becoming available to other users. The communications can also be communicated to users as part of a feed on a particular topic to which the users have subscribed.

Client devices 130 and 140 can be configured to retrieve communications such as user feedback and/or comments from communication host server 120. For example, client devices 130 and 140 can access communication host server 120 to receive communications submitted by other users to communication platform 121, as mentioned above. Client devices 130 and 140 can also be configured to submit communications to communication platform 121.

Generally speaking, client devices 130 and 140 may communicate with communication host server 120 using a wide range of technologies. Example technologies include transmission control protocol/internet protocol ("TCP/IP") and/or hypertext transfer protocol ("HTTP") connections, ethernet, feeds (e.g., Atom, Really Simple Syndication or "RSS"), email, messaging services such as SMS and Multimedia Messaging Service ("MMS"), etc. Client devices 130 and 140 may include various applications that implement these technologies. For example, client devices 130 and 140 may include browser software that implements HTTP communications for users to read message board postings, tweets, blog entries, web page comments, etc. Likewise, client devices 130 and 140 may include SMS and/or MMS applications for "tweeting," email applications, etc.

Note also that the technology used by a client device to submit a particular communication is not necessarily the same technology that is used to retrieve the communication. For example, client device 130 may tweet about a particular topic using SMS. Communication platform 121 may receive the tweet using SMS. However, communication platform 121 does not necessarily send the tweet to other user devices via SMS. Instead, for example, communication platform 121 may provide access to the tweet via a web page, and client device 140 may submit an HTTP GET request to retrieve the tweet from the web page. However, in some implementations, the same technology may be used to submit and retrieve a particular communication.

Summarization server 150 can be configured to summarize communications that are submitted to communication host server 120. For example, social summarizer 151 on summarization server 150 can be configured to process a number of user communications provided by users of client devices 130 and 140, and generate a summary of the communications. In some implementations, the summary may relate to a number of communications that each include and/or reference an individual "connector," such as a web page link (e.g., a uniform resource locator or "URL") or a Twitter™ hashtag.

Figure 2:
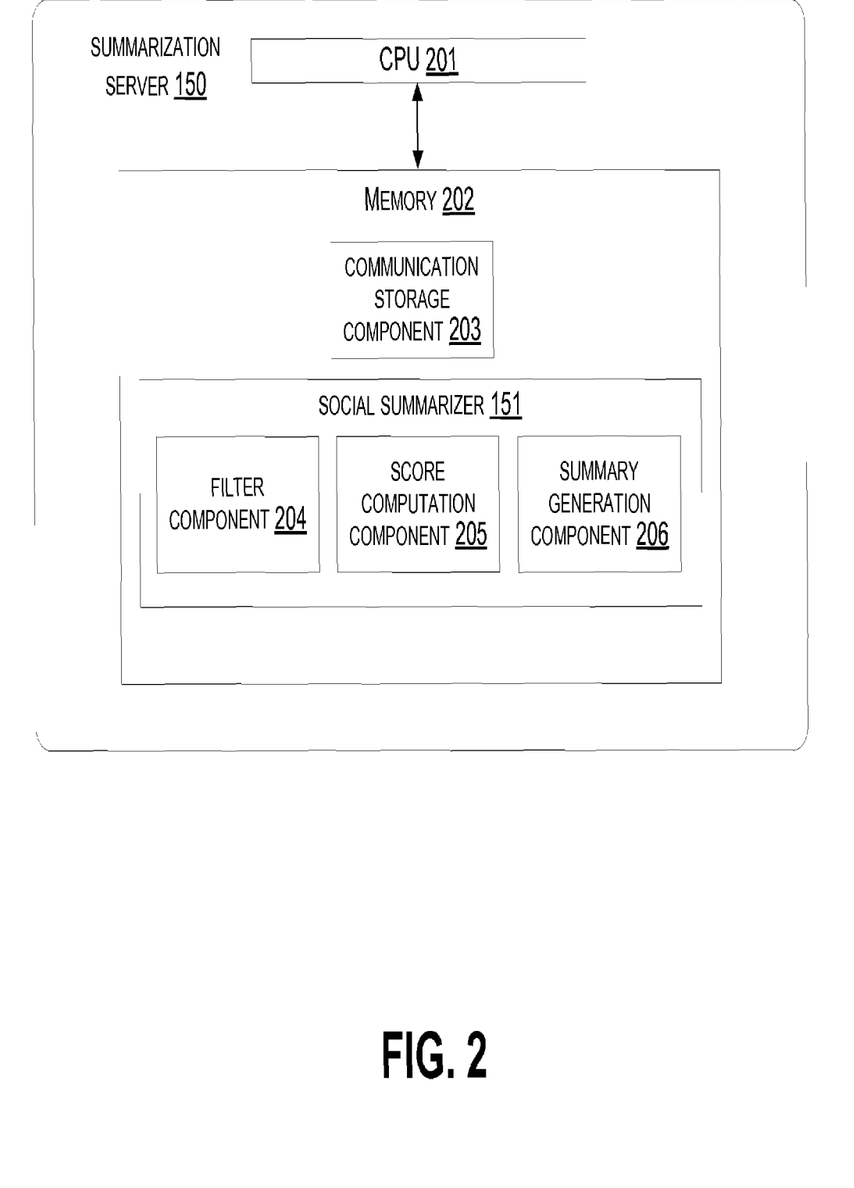
FIG. 2 shows exemplary components of a device in accordance with some implementations of the present concepts.

FIG. 2 shows an exemplary architecture of summarization server 150 that is configured to accomplish the concepts described above and below. Summarization server 150 can include a central processing unit ("CPU") 201, operably connected to a memory 202. For example, CPU 201 can be a reduced instruction set computing (RISC) or complex instruction set computing (CISC) microprocessor that is connected to memory 202 via a bus. Memory 202 can be a volatile storage device such as a random access memory (RAM), or non-volatile memory such as FLASH memory. Although not shown in FIG. 2, summarization server 150 can also include various input/output devices, e.g., keyboard, mouse, display, printer, etc. Furthermore, summarization server 150 can include one or more non-volatile storage devices, such as a hard disc drive (HDD), optical (compact disc/digital video disc) drive, tape drive, etc. Generally speaking, any data processed by summarization server 150 can be stored in memory 202, and can also be committed to non-volatile storage. Client devices 130 and 140 and communication host server 120 can have similar hardware components as summarization server 150.

Memory 202 of summarization server 150 can include various components that implement certain processing described herein. For example, memory 202 can include social summarizer 151, which is configured to generate summaries of communications that are submitted to communication platform 121. Social summarizer 151 can include a filter component 204, a score computation component 205, and a summary generation component 206. Memory 202 can also include a communication storage component 203, which can be configured to store communications such as those submitted to communication host server 120. Components 151 and 203-206 can include instructions stored in one or more computer-readable storage media such as memory 202, and these instructions can be read and executed by central processing unit (CPU) 201. Furthermore, components 151 and 203-206 can also be stored in other computer-readable storage media, such as the aforementioned non-volatile storage devices, and retrieved to memory 202 to implement the processing described herein.

As mentioned above, communication storage component 203 can be configured to store communications submitted by client devices 130 and 140 to communication host server 120. For example, communication storage component 203 may be configured to retrieve the communications from communication host server 120 after they are submitted by various users. Alternatively, communication storage component 203 may be configured to receive the communications directly from client devices 130 and 140. The various technologies discussed above may be used to receive the communications, e.g., TCP/IP, feeds, email, etc.

Filter component 204 can be configured to filter communications that are stored by communication storage component 203. For example, filter component 204 can filter the communications to identify a subset of individual communications that each include a reference to one or more connectors. Score computation component 205 can be configured to compute scores for each of the filtered communications. For example, score computation component 205 can be configured to compute scores reflecting semantic relationships between two or more communications. The scores can be based on similarity metrics that reflect the similarity of communications to one another, and/or diversity metrics that reflect the differences between communications. Summary generation component 206 can be configured to generate a summary of the one or more connectors. For example, summary generation component 206 can be configured to select one or more of the communications to include in the summary, based on the computed scores.

Note that social summarizer 151 is described below with respect to implementations on summarization server 150. However, social summarizer 151 can be embodied on various types of devices. For example, social summarizer 151 can be collocated on communication host server 120 to summarize communications hosted thereon. Social summarizer 151 can also be embodied on other processing devices with access to the communications, such as a personal computer (PC), laptop, cell phone, personal digital assistant ("FDA"), etc.

Furthermore, the functionality described herein with respect to social summarizer 151 can be distributed across multiple devices. For example, filter component 204 could be embodied on a first device, score computation component 205 could be embodied on a second device, and summary generation component 206 could be embodied on a third device. Furthermore, social summarizer 151 or the individual components thereof (203-206) can be distributed across multiple devices, e.g., in a server farm, one or more server racks, across several web or application servers, etc.

Figure 3:
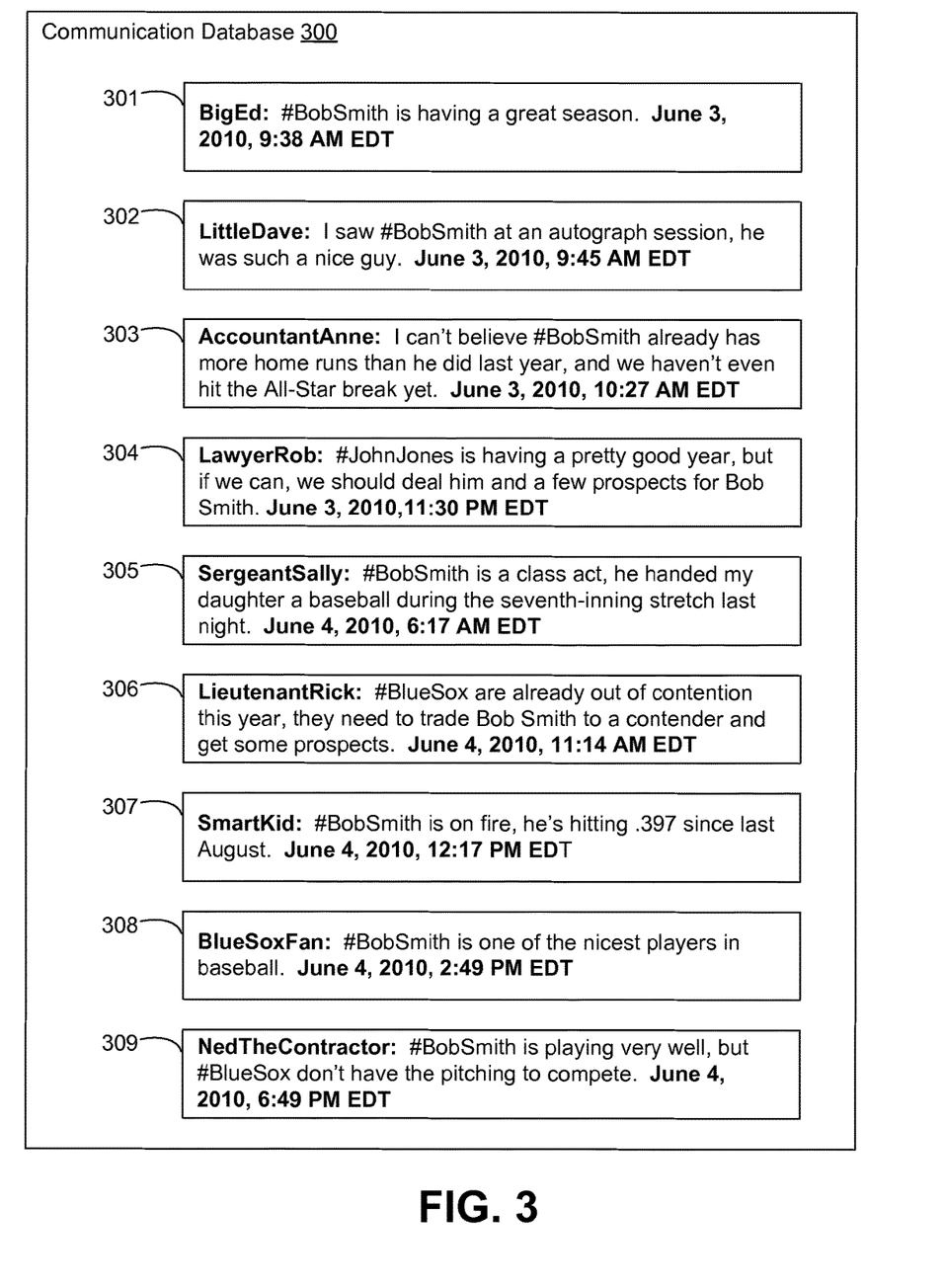
FIG. 3 shows an example of a data structure in accordance with some implementations of the present concepts.

FIG. 3 illustrates an exemplary communication database 300. Communication database 300 can be maintained by communication storage component 203 of summarization server 150. For example, communication database 300 may be maintained as a text file, a structured query language ("SQL") table, a spreadsheet, a comma-separated values ("CSV") file, a word processing file, or other suitable data structure. For brevity and simplicity, nine communications are illustrated in FIG. 3. However, additional communications that are included in communication database 300 but are not shown in FIG. 3 will be introduced below.

Generally speaking, entries in communication database 300 can include the communications provided by the users, e.g., "#BobSmith is having a great season" as illustrated by communication 301. Communication database 300 can also include metadata such as user names of the individual users who provided the communications, e.g., "BigEd." Communication database 300 can also include additional metadata such as the time and/or date that the communication was submitted, e.g., "Jun. 3, 2010, 9:38 AM EDT."

For the purposes of explanation, the communications shown in the example of FIG. 3 generally relate to a baseball team called the Baltimore BlueSox. In some implementations, the communications may be associated with feed for a particular subject, e.g., the BlueSox. As an example, communication platform 121 can be a general-purpose real-time messaging service with a BlueSox-specific feed, as well as other feeds not discussed herein. As another example, the communications platform can be from a blog, microblog, or message board relating to the BlueSox. The communications from the BlueSox feed, blog, or message board can be provided to summarization server 150, summarized using the implementations described herein, and provided on a web page associated with the BlueSox.

Further, many of the communications reference a BlueSox player named "Bob Smith." Some of the communications also include connectors such as hashtags that help identify one or more topics of the communication. For example, communications 301-303, 305, and 307-309 include the hashtag "#BobSmith," communication 304 includes the hashtag "#JohnJones," and communications 306 and 309 include the hashtag "#BlueSox." In some implementations, communications hosted by communication host server 120 and/or stored by summarization server 150 are searchable by hashtag.

Note that, in some implementations, the number of communications is much larger than the examples presented herein, perhaps numbering hundreds or thousands of communications. Furthermore, some of the communications may be unrelated or only tangentially related to hashtags included therein. Under such circumstances, it may be difficult for a user to understand recurring or dominant themes in the communications. Thus, it may be desirable to provide one or more users with a summary of the communications.

Figure 4:
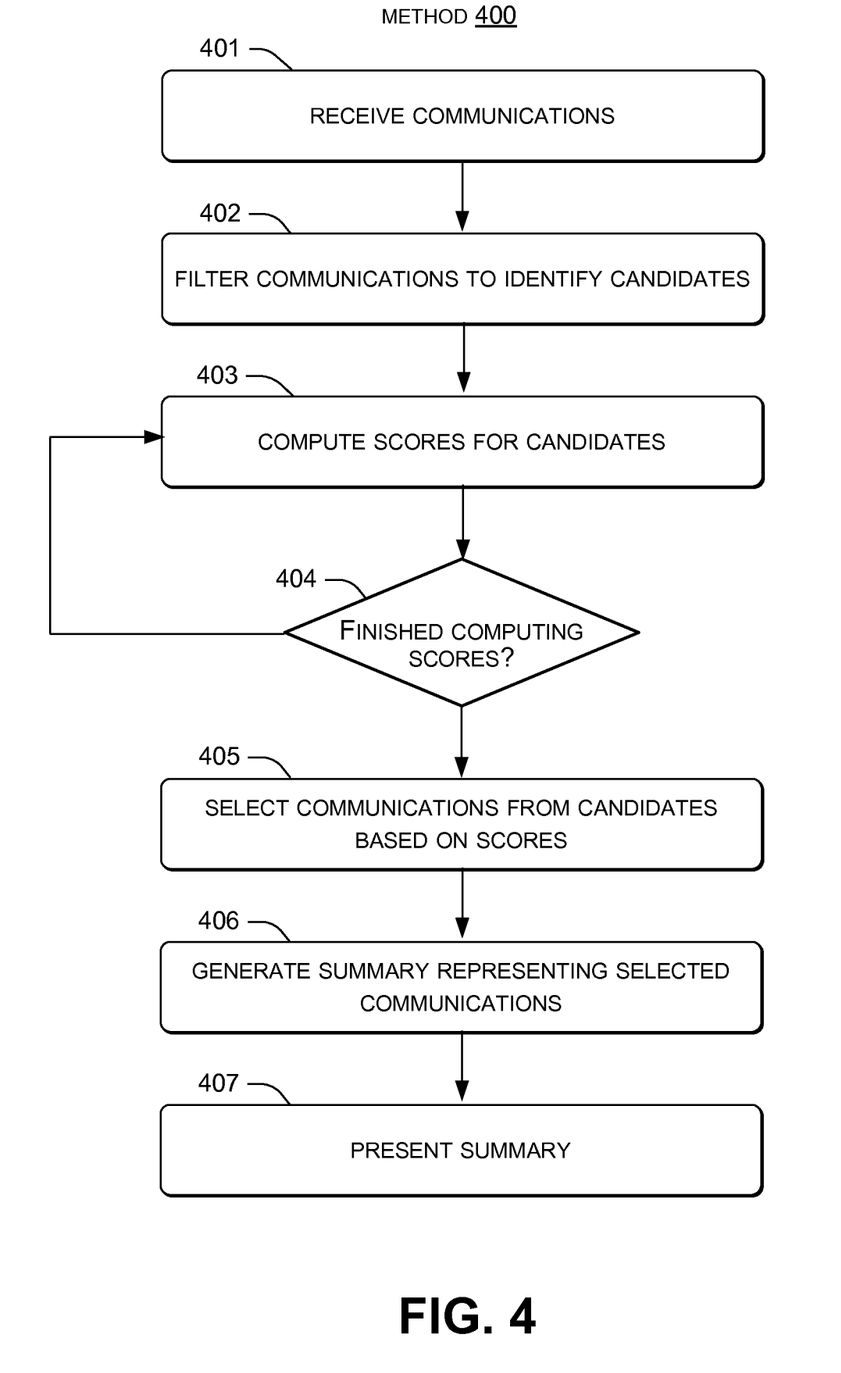
FIGS. 4, 6, and 7 show flowcharts of exemplary methods that can be accomplished in accordance with some implementations of the present concepts.

FIG. 4 illustrates a method 400, also suitable for implementation in system 100 or other systems. Summarization server 150 can implement method 400, as discussed below. Note that method 400 is discussed herein as being implemented on summarization server 150 for exemplary purposes, but is suitable for implementation on many different types of devices.

Communications can be received at block 401. For example, communication storage component 203 can receive communications that are submitted by client devices 130 and/or 140 to communication platform 121. Communication storage component 203 can receive the communications directly from client devices 130 and 140, or may download the communications from communication host server 120.

The communications can be filtered at block 402 to identify candidates to include in a summary. For example, filter component 204 may filter the communications by connector, e.g., hashtag or web link, to identify candidate communications relating to a particular topic. For the purposes of this example, the communications are filtered to identify those communications with the "#BobSmith" hashtag. Thus, in this example, the filtered communications include communications 301-303, 305, and 307-309. As discussed in more detail below, the communications can also be filtered by other criteria, such as user-selectable options for language, time period, geographic location, etc.

Scores may be computed for the filtered candidate communications at block 403. For example, score computation component 205 can compute scores reflecting semantic relationships between two or more of the candidate communications. The scores can be based on one or more metrics reflecting the relative similarity and/or diversity of the various candidate communications. Exemplary similarity and diversity metrics for computing the scores are discussed in more detail below.

Decision block 404 can include determining whether scores have been computed for each of the candidate communications. As shown in FIG. 4, if the scores have not finished computing, method 400 can return to block 403 to continue computing the scores. Alternatively, if scores have been computed for each of the candidate communications, method 400 can move to block 405.

Candidate communications can be selected based on the scores at block 405. For example, summary generation component 206 may select the candidate communications with the highest scores. For the purposes of this example, summary generation component 206 can select four candidate communications. For example, summary generation component 206 can select communication 308 as the highest scoring candidate communication, and communication 301 as the second highest scoring candidate communication, as well as the next two highest-scoring candidate communications (not shown in FIG. 3).

A summary can be generated at block 406. For example, summary generation component 206 can generate a summary of the hashtag "#BobSmith." The summary can represent the selected communications. In the present example, the summary includes the four selected communications, each of which includes the hashtag. More generally, the summary can represent a subset of communications that include and/or reference a connector.

Figure 5:
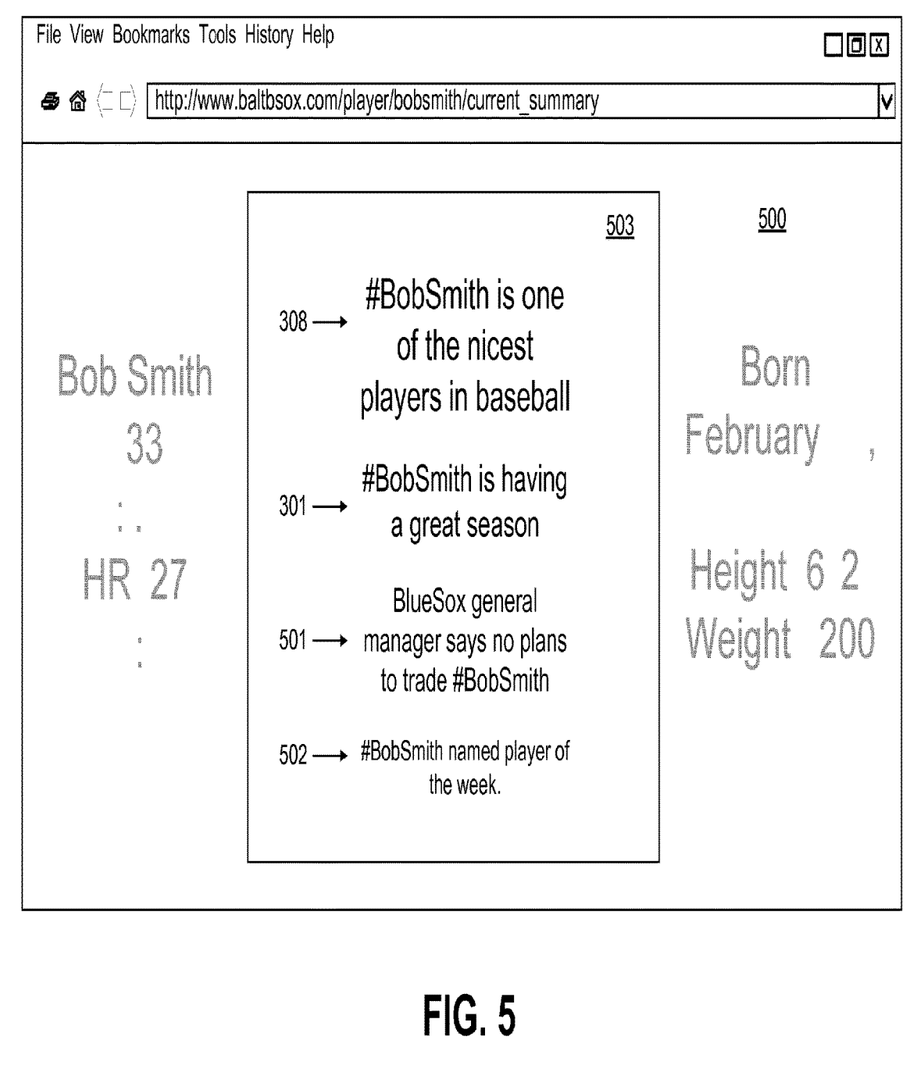
FIGS. 5, 8, and 9 show exemplary graphical user interfaces that can be presented in accordance with some implementations of the present concepts.

The summary can be presented at block 407. For example, the summary can be displayed in a connector summary page 500, as shown in FIG. 5. Connector summary page 500 includes four individual communications 301, 308, 501, and 502. For the purposes of illustration, communications 301, 308, 501, and 502 are collectively included in a summary box 503. Each of communications 301, 308, 501, and 502 includes the hashtag "#BobSmith." Note that, while not shown in FIG. 3, communications 501 and 502 can also be selected for the summary in block 406. Thus, communications 301, 308, 501, and 502 can collectively represent a summary of the hashtag "#BobSmith."

In some implementations, summarization server 150 can send connector summary page 500 as HTML code to client devices 130 and/or 140. Connector summary page 500 can be rendered by the client devices to appear as shown in FIG. 5. In other implementations, summarization server 150 may send the code to communication host server 120, a web server, or any other device with which client devices 130 and 140 can communicate. In other implementations, the summary generated at block 406 can be provided in text format, as part of a feed, as one or more SMS messages, etc.

In some implementations, connector summary page 500 can be displayed with a web page associated with the connector. In FIG. 5, connector summary page 500 includes communications 301, 308, 501, and 502 superimposed over a web page associated with Bob Smith, e.g., a player page on a web site for Bob Smith's team. The player page can include information such as statistics, date of birth, height, weight, and can be displayed as a faded background behind the communications in the summary. More generally, summaries for a given topic can be displayed by superimposing the summaries over web pages associated with the topic.

As also shown in FIG. 5, connector summary page 500 includes four individual communications, 308, 301, 501, and 502 displayed in a manner to reflect the score of the communications that is computed at block 403. For example, the highest-scoring communications may be displayed at the top of connector summary page 500, and/or in a larger font size. Thus, by viewing connector summary page 500, a user can see that communication 308 is the highest-scoring communication, followed by communications 301, 501, and 502. In further implementations, the relative scores of communications in connector summary page 500 may be visually distinguished using other techniques besides the location or font size. For example, techniques such as varying color, font style, underline, bold, italics, etc. can be used to visually distinguish the communications. Note that the communications in the summary can each reflect a theme from the various communications that include the connector #BobSmith. For example, from the communications shown in FIG. 3, communications 302, 305, and 308 generally relate to the idea that Bob Smith is a nice person. In the example shown in FIG. 5, communication 308 is selected for the summary and represents the idea that Bob Smith is a nice person. Likewise, as shown in FIG. 4, communications 301, 303, 307, and 309 generally relate to the idea that Bob Smith is playing well recently. From these communications, communication 301 is selected for the summary and represents the idea that Bob Smith is a nice person. Similarly, communications 501 and 502 can represent other communications from communication database 300 not shown in FIG. 4.

In some implementations, the number of communications for the summary is fixed, e.g., four in the example above. In other implementations, the number of communications can vary depending upon the scores for the individual communications. For example, a threshold can be used, and those communications having a score exceeding the threshold can be included in the summary. In further implementations, the number of communications included in the summary can be determined based on a user-selectable option. For example, a user could request a summary with four communications that reference the hashtag "BobSmith."

As also introduced above, users can be provided with additional selectable options for requesting summaries. As an example, users can have the option of requesting summaries for particular languages. As another example, users can have the option of requesting summaries for particular time periods, e.g., communications from the past 24 hours, communications within a user-defined date and/or time range, etc. In such implementations, block 402 of method 400 can include filtering communications by the user-selected options as well as by the connector. Thus, for example, if a user selects the hashtag "#BobSmith" and requests communications in Spanish for August of 2010, the filtering can identify candidate communications that meet the user's criteria. Note that this can result in fewer candidate communications being input to block 403, which can in turn improve processing efficiency because fewer scores are computed.

Generally speaking, by using method 400 as discussed above, it is possible to provide a representative summary of the communications in communication database 300 that include the connector "#BobSmith." From the various communications that include "#BobSmith," four communications are used in this example to represent four different themes represented by the communications as a whole. Thus, a user having the benefit of such a summary may not need to read all of the communications to understand most, or at least a significant portion, of the information conveyed by the communications that are not included in the summary. This aspect of the disclosed implementations may be particularly beneficial in circumstances where there are a large number of communications including and/or referencing a particular connector.

Score Computation

Figure 6:
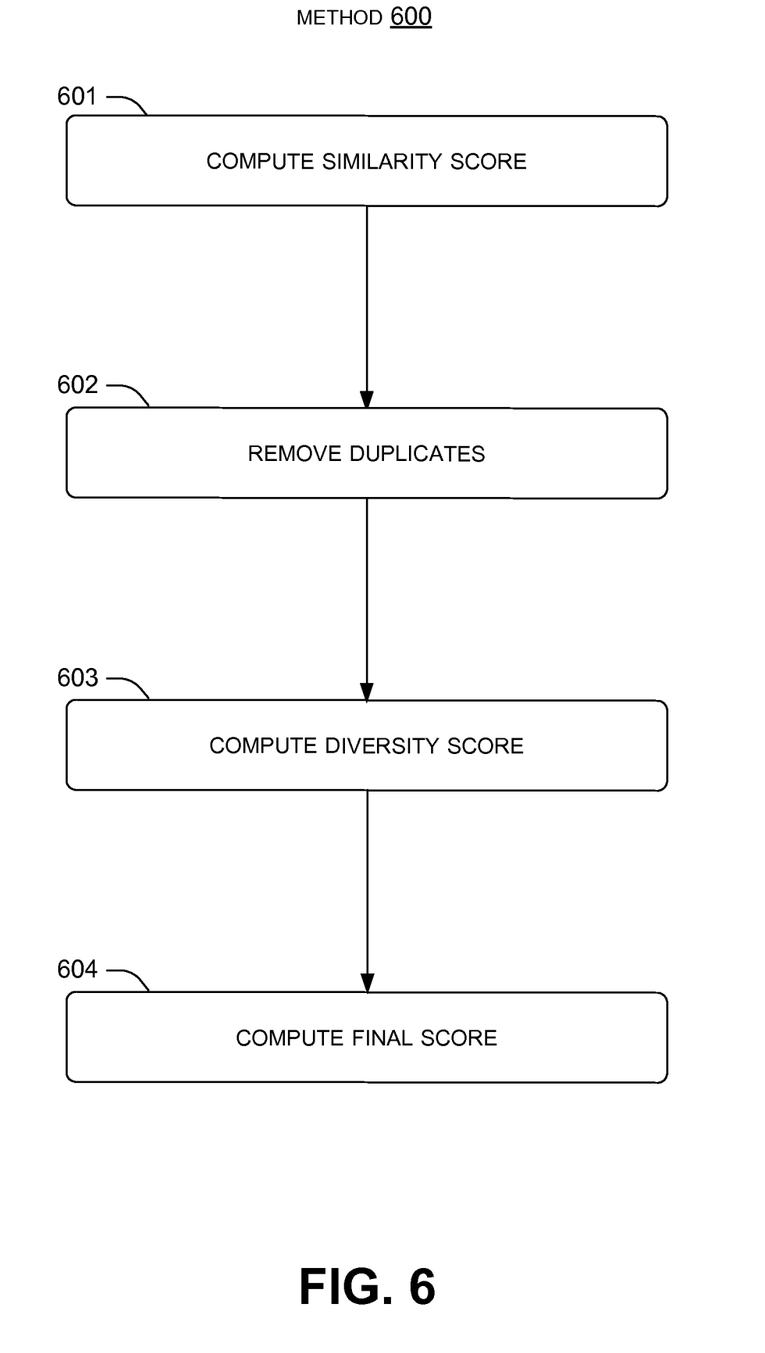

FIG. 6 illustrates a method 600 for computing a score for one or more individual communications. For example, method 600 may be performed as part of processing associated with block 403 as discussed above, and in this context may be considered a detailed view of block 403. Like method 400, method 600 is also suitable for implementation in system 100 or other systems. Score computation component 205 of summarization server 150 can implement method 600, as discussed below. Note that method 600 is shown as being implemented on summarization server 150 for exemplary purposes, but is suitable for implementation on many different types of devices.

Block 601 can include computing similarity scores for the communications in communication database 300, and more particularly for the filtered candidate communications having a common connector, as discussed above with respect to block 402. For example, similarity scores can be computed for a given communication using a similarity metric that reflects the semantic similarity of the communication to the other filtered communications. In some implementations, the similarity metric is a Jaccard similarity represented as a value between 0 and 1. The similarity metric may reflect the similarity between any two or more communications on a word-by-word or character-by-character basis. For example, individual similarity scores for a given communication can be computed for every other filtered communication. These individual similarity scores can be added together to determine a final similarity score for the communication, reflecting the similarity of the communication to the other filtered communications as a whole. In other implementations, the individual similarity scores can be summed for only a subset of the individual communications, e.g., communications in a particular language, timeframe, etc.

Block 602 can include removing duplicate and/or near duplicate communications. For example, communications having a Jaccard similarity exceeding a threshold (e.g., 0.95) may be considered as duplicates and/or near-duplicates. In some implementations, a higher threshold is used for duplicates than for near-duplicates, e.g., 0.95 for duplicates and 0.90 for near-duplicates. In other implementations, other techniques for near-duplicate record detection can be applied to identify and remove duplicates and/or near-duplicates. As an example, a communication such as "#BobSmith is the nicest baseball player" could be considered a near-duplicate of communication 308, "#BobSmith is one of the nicest players in baseball." As another example, a "retweet" can be identified as a duplicate or near-duplicate record at block 602, and removed from the filtered communications. As a further example, a quoted message on a message board without substantial further commentary added to the quoted message can also be removed at block 602.

Block 603 can include computing a diversity score in a manner similar to that discussed above for similarity scores. In some implementations, the diversity score is represented using a metric such a Kullback-Leibler ("KL") divergence, which can be a value between 0 and 1. The diversity metric may reflect the divergence or differences between two or more communications on a word-by-word or character-by-character basis. Maximum entropy techniques can also be applied in block 603 in place of, or in addition to, KL divergence. Generally speaking, block 603 may serve to increase the likelihood that the communications selected for the summary will be sufficiently diverse to reflect different themes from the filtered communications, rather than presenting multiple communications in the summary that have essentially the same meaning.

Block 604 can include computing a final score for the communications. For example, the final score for a given communication can be a combination of the similarity score and the diversity score. In some implementations, the final score can be a weighted sum of the similarity score and the diversity score. Generally speaking, weighting the diversity score more highly than the similarity score may result in a broader range of themes being included in the summary. Similarly, weighting the similarity score more highly may result in a narrower range of themes being included in the summary.

Note that, in some implementations, communications with many duplicate or near-duplicate communications may generally have higher similarity scores, because they can tend to have high individual similarity scores for the other duplicate and/or near-duplicate communications. This can tend to result in a higher final score for these communications, which can in turn be reflected when the summary is displayed by a larger font size, more prominent placement in the display, etc.

Furthermore, note that the implementations discussed herein can use alternative similarity and/or diversity metrics. For example, in addition to Jaccard similarity, Dice coefficients, Levenshtein distance, Cosine Similarity, and/or Hamming distances can be used as similarity metrics. Likewise, Kolmogorov-Smirnov ("KS") tests can be used with or in place of KL divergence as a diversity metric.

The processing discussed above with respect to blocks 601 and 602 can be implemented by computing similarity scores between every permutation of two candidate communications. However, in some implementations, transitivity relationships can be used to reduce the total number of similarity scores that are computed. For example, consider three candidate communications, S1, S2, and S3. If S1 is sufficiently similar to S2 to be considered a duplicate or near-duplicate of S2, and S2 is likewise sufficiently similar to S3 to be considered a duplicate or near-duplicate of S3, then it may follow that S3 is a duplicate or near-duplicate of S1.

Thus, in some implementations, the similarity score between S1 and S3 is not computed when S3 is identified as a duplicate or near-duplicate of a communication (S2) that has already been identified as a duplicate or near-duplicate of S1. By iteratively removing duplicates or near-duplicates as they are identified, the total number of computations for method 600 can be reduced. The extent to which the number of computations is reduced may depend on the distribution of duplicate or near-duplicate candidate communications. In circumstances where there are many duplicate or near-duplicate communications, more computations can be avoided by iteratively removing the duplicate or near-duplicate communications.

Summaries by Characteristic

In many cases, user communications about a particular topic can differ depending on certain characteristics, such as when the communications are submitted by the users. For example, early in a baseball season, many discussions about Bob Smith may relate to his character as reflected in the communications discussed above. Later in the season, Bob Smith may be selected for the All-Star team. As users begin communicating about Bob Smith's All-Star selection, this may become the dominant theme of discussion, superseding discussions about Bob Smith's character as a nice person. Under such circumstances, it may be desirable to provide summaries on a characteristic-specific basis. For example, when the characteristic is time periods, summaries can be provided monthly so that users can see how discussions about certain topics have changed over time. As another example, if the characteristic is language, summaries can be provided for different languages.

Figure 7:
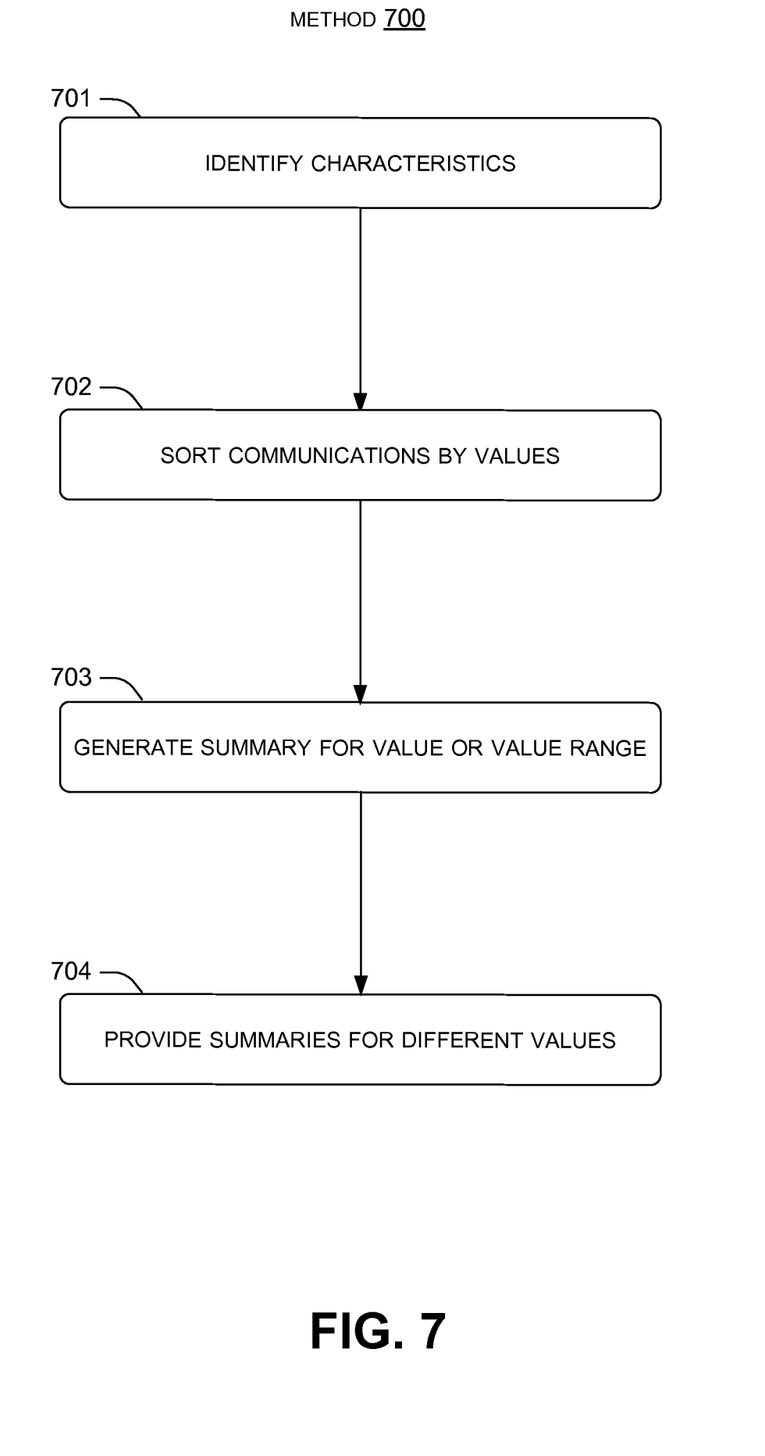

FIG. 7 illustrates a method 700 for summarizing communications by characteristics of the communications. Summarization server 150 can implement method 700, as discussed below. Note that method 700 is shown as being implemented on summarization server 150 for exemplary purposes, but is suitable for implementation on many different types of devices, either in system 100 or other systems. For the purposes of the specific example that follows, the communications are summarized by time period, although the disclosed implementations are also consistent with other characteristics of communications, e.g., language, geographic location, etc.

Characteristics for communications can be identified at block 701. For example, as discussed above, the communications in communication database 300 may have an associated date and/or time characteristic that indicates when the communication was submitted to communication platform 121. In some implementations, the communications may include metadata, such as a timestamp that includes values for the date and/or time. The timestamp can represent when the communications are received by communication platform 121. In other implementations, summarization server 150 may use regular expressions or other techniques to identify time data in the communications.

The communications can be sorted by the values for the characteristics at block 702. For example, the communications can be sorted by month, by year, by day, etc. In some implementations, the communications can be sorted chronologically at block 702. For the purposes of the present example, communications in communications database 300 are sorted into groups for three consecutive months, e.g., June 2010, July 2010, and August 2010. However, note that communications can also be sorted by nonconsecutive and/or overlapping time periods.

A summary can be generated for each value or value range of the characteristics at block 703. For example, method 400 can be applied to the communications for each month, to generate separate summaries for June, July, and August 2010. Note that while this example uses value ranges (e.g., time periods) of relatively equal length, e.g., one month each, the time periods can also vary in length. For example, a first summary could be generated for January-June 2010, and a second summary could be generated for July 2010, etc. Furthermore, summaries can be generated for predetermined time periods, e.g., a well-known event such as the World Series, World Cup, elections, etc.

The summaries can be provided for the different characteristic values at block 704. For example, summarization server 150 may provide the summaries to users in a manner similar to that discussed above with respect to method 400, e.g., as HTML code for a web page. Also as discussed above, summarization server 150 may send the summaries directly to client devices 130 and/or 140 over network 110. Alternatively, summarization server 150 can provide the summaries indirectly, by sending them to communication host server 120 or another device (e.g., a web server) accessible by client devices 130 and/or 140.

Figure 8:
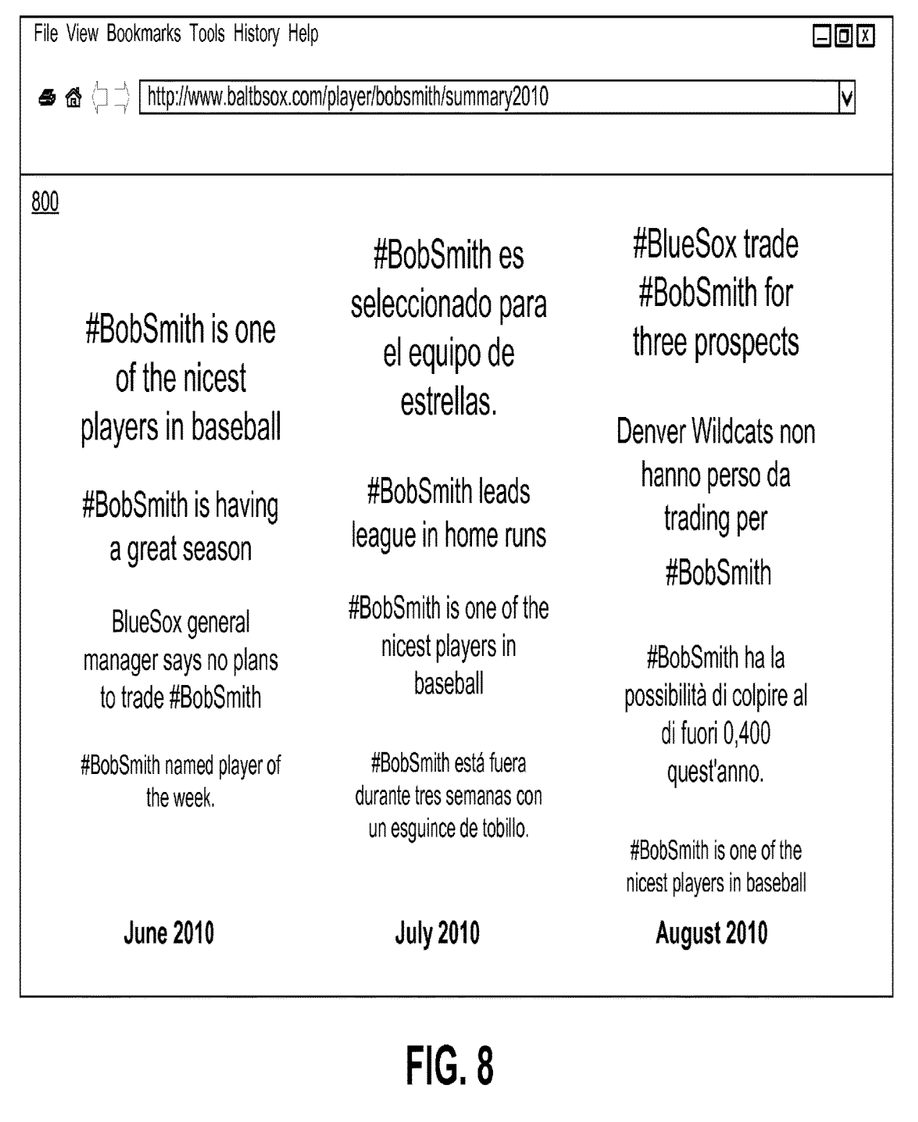

FIG. 8 illustrates an exemplary chronological summary 800 that can be provided by method 700. In this example, chronological summary 800 reflects three consecutive time periods, June, July, and August 2010. As viewed in FIG. 8, the time periods are shown in chronological order from left to right, with later time periods shown to the right of earlier time periods. Thus, by viewing a summary that shows representative communications for different time periods, a user can understand how the conversation themes for a particular topic have changed over time. In some implementations, chronological summaries for a particular topic can be viewed as a narrative for the topic over the time period covered by the chronological summaries.

Chronological summary 800 also illustrates a circumstance where the user has requested communications in English for June 2010, English and Spanish for July 2010, and English and Italian for August 2010. Thus, chronological summary illustrates summarization by two different characteristics of the communications, e.g., time period and language. Note that method 700 can be applied to many different combinations of communication characteristics.

Note also that communications can be filtered and presented based on characteristics other than time periods or language. For example, communications can be filtered by the location from where the communication was originally submitted or received. In such implementations, communication summaries can be presented on a location-by-location basis, e.g., a first summary for Germany, a second summary for Great Britain, etc. The communication summaries can be presented together, e.g., the summary for communications originating in Germany and the summary for communications originating in Great Britain can be combined into a single web page.

Alternatively, location-specific summaries can be provided to individuals depending on where they are located. In such implementations, users in Great Britain could receive the summary of communications originating in Great Britain, and users in Germany could receive the summary of communications originating in Germany. In still further implementations, users can be provided the opportunity to select whether they want to see location-based summaries for a particular location, or location-by-location summaries for several areas at once.

Additional Implementations

The implementations discussed above are but some of many possible implementations. For example, a hashtag was described above as an example of a connector, and communications including a particular hashtag were processed to generate a summary of the hashtag. However, the connector could also be a link to a web page, such as a recent news article.

Figure 9:
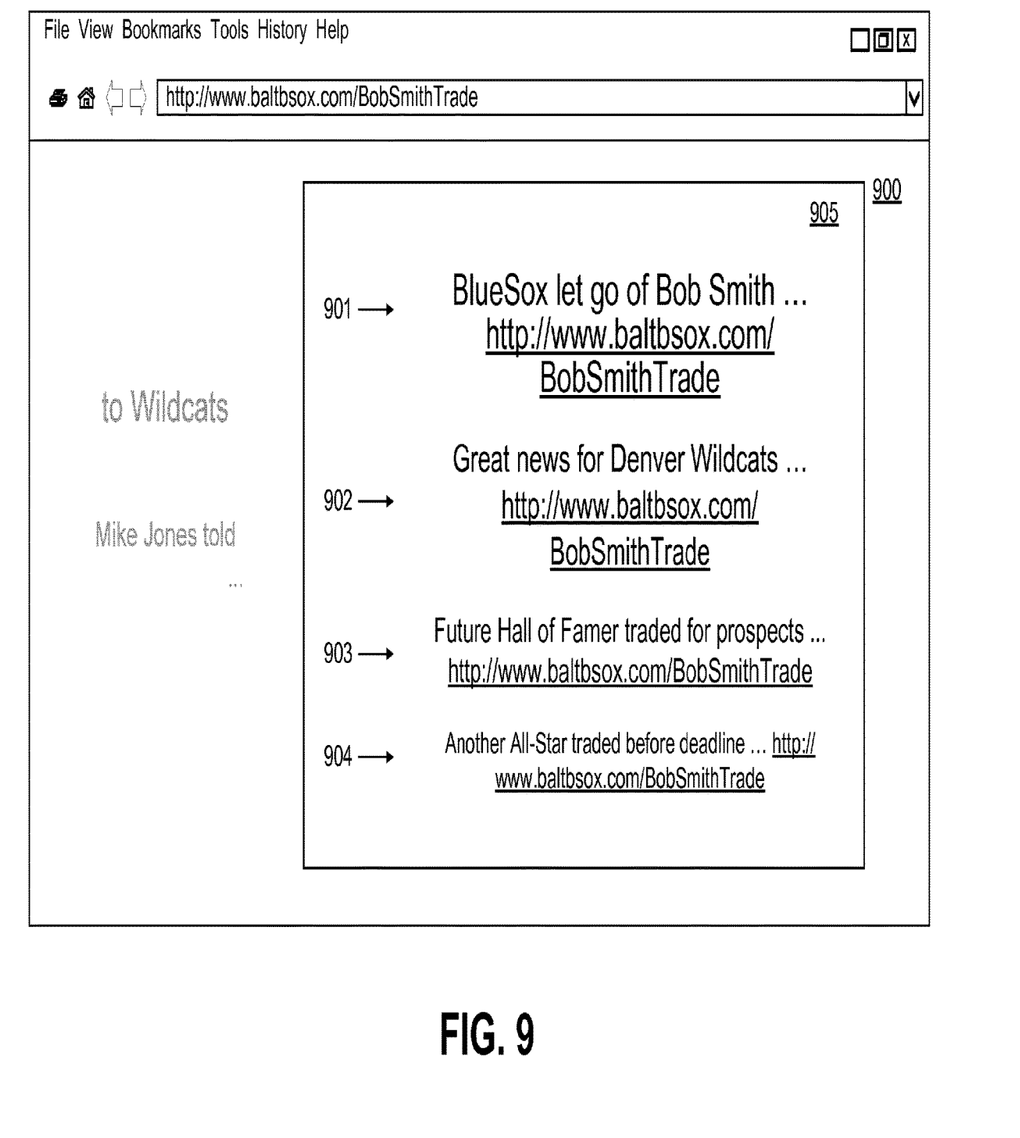

For example, FIG. 9 illustrates an exemplary connector summary page 900. Generally speaking, connector summary page 900 can be a summary of a connector such as a web link, e.g., "http://www.baltbsox.com/BobSmithTrade." Connector summary page 900 can be generated using method 400. In some implementations, the summary can be presented in a manner similar to that shown in FIG. 5. For example, as shown in FIG. 9, communications 901, 902, 903, and 904 are included in a summary box 905. Summary box 905 is superimposed over the news article that is available at the web link for the connector, e.g., http://www.baltbsox.com/BobSmithTrade.

As discussed above, individual words, letters, or combinations thereof can also serve as connectors. For example, instead of a hashtag, phrases such as "Bob Smith," "All-Star," etc. can be used as connectors. In some implementations, users can provide queries to summarization server 150, and summarization server 150 can generate a summary by treating the query terms as connectors.

Furthermore, the disclosed implementations can be used as an alternative to traditional captions or snippets provided by a web search engine. Generally speaking, a user who enters a query to a web search engine may receive a list of web pages matching the search, and associated snippets which generally can include text taken from the web page, such as the first paragraph, an abstract, etc. In some implementations, summaries generated using method 400 can be used as snippets to replace and/or supplement traditional search engine snippets. Thus, users of the search engine can be presented with a snippet that is based on a summary reflecting the viewpoints of different users.

As also discussed, the concepts presented herein can be used to present summaries that include communications from different languages. For example, given a communications database that includes communications in several different languages, a single summary for a given connector can be generated that includes a sentence in more than one of the languages. This can be a result of the scoring methodology disclosed above, because communications in the same language may generally have relatively high similarity scores to each other, and at the same time may generally exhibit relatively high diversity scores when compared with communications in other languages.

Note that the exemplary communications presented herein generally include complete sentences. However, in some cases, users may tend to communicate using "textual fragments" that are not necessarily complete sentences. The implementations discussed above are consistent with communications that include only textual fragments, as well as communications that include complete sentences.

Furthermore, in some implementations, the communications do not necessarily need to be embodied as text. For example, the communications could be appended as metadata to multimedia files such as images, video, or audio. Furthermore, communications can be extracted from images, video, or audio using optical character recognition and/or speech recognition techniques, and processed using the disclosed implementations.

CONCLUSION

Although techniques, methods, devices, systems, etc., pertaining to the above implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method comprising:
   filtering a plurality of communications to identify a subset of the communications that include a common hashtag or web link;
   computing similarity scores for the identified subset of the communications, the similarity scores reflecting semantic similarities among individual communications of the subset;
   computing diversity scores for the identified subset of the communications, the diversity scores reflecting semantic differences among individual communications of the subset;
   combining the similarity scores and the diversity scores to determine total scores for the identified subset of communications;
   selecting individual communications based on the total scores; and
   generating a summary of the common hashtag or web link, the summary representing the selected individual communications,
   wherein weighting the diversity score more than the similarity score promotes a broader range of themes being included in the summary.

2. The method according to claim 1, further comprising:
   removing duplicate or near-duplicate communications from the identified subset based on the similarity scores.

3. The method according to claim 2, wherein the removing is performed before computing the diversity scores.

4. The method according to claim 1, wherein combining comprises adding the similarity scores and the diversity scores for the individual communications of the subset.

5. The method according to claim 4, further comprising weighting the similarity scores and the diversity scores by different values.

6. The method according to claim 1, further comprising at least one of:
   identifying duplicate communications from the identified subset based on the similarity scores; and
   identifying near-duplicate communications from the identified subset based on the similarity scores.

7. A system, comprising:
   one or more processors; and
   a memory storing processing instructions that, when executed, cause the one or more processors to perform operations comprising:
      filtering a plurality of communications to identify a subset of the communications that include a common hashtag or web link;
      computing similarity scores for the identified subset of the communications, the similarity scores reflecting semantic similarities among individual communications of the sub set;
      computing diversity scores for the identified subset of the communications, the diversity scores reflecting semantic differences among individual communications of the sub set;
      combining the similarity scores and the diversity scores to determine total scores for the identified subset of communications;
      selecting individual communications based on the total scores; and
      generating a summary of the common hashtag or web link, the summary representing the selected individual communications,
      wherein weighting the similarity score less than the diversity score promotes a broader range of themes being included in the summary.

8. The system according to claim 7, the operations further comprising removing duplicate or near-duplicate communications from the identified subset based on the similarity scores.

9. The system according to claim 8, wherein the removing is performed before computing the diversity scores.

10. The system according to claim 7, wherein the combining comprises adding the similarity scores and the diversity scores for the individual communications of the subset.

11. The system according to claim 10, the operations further comprising weighting the similarity scores and the diversity scores by different values.

12. The system according to claim 7, the operations further comprising at least one of:
   identifying duplicate communications from the identified subset based on the similarity scores; and
   identifying near-duplicate communications from the identified subset based on the similarity scores.

13. A method comprising:
   identifying a subset of a plurality of communications that include a common connector;
   computing, for the identified subset of the communications, both (i) similarity scores reflecting semantic similarities among individual communications of the subset;

(ii) diversity scores reflecting semantic differences among individual communications of the subset;

determining total scores for the identified subset of communications by combining the similarity scores and the diversity scores;

selecting individual communications based on the total scores; and generating a summary of the common connector, the summary representing the selected individual communications, wherein weighting the diversity score more than the similarity score promotes a broader range of themes being included in the summary.

14. The method according to claim 13, wherein the common connector comprises a hashtag or a web link that is included in each of the selected individual communications that are represented by the summary.

15. The method according to claim 13, further comprising removing duplicate or near-duplicate communications from the identified subset based on the similarity scores.

16. The method according to claim 15, wherein the removing is performed before computing the diversity scores.

17. The method according to claim 13, wherein combining comprises adding the similarity scores and the diversity scores for the individual communications of the subset.

18. The method according to claim 17, further comprising weighting the similarity scores and the diversity scores by different values.

19. The method according to claim 13, wherein the summary includes the selected individual communications.

20. The method according to claim 13, further comprising at least one of:

identifying duplicate communications from the identified subset based on the similarity scores; and identifying near-duplicate communications from the identified subset based on the similarity scores.

* * * * *